United States Patent
Peterson et al.

(10) Patent No.: US 10,252,645 B1
(45) Date of Patent: Apr. 9, 2019

(54) VENTILATED CHILD CAR SEAT

(71) Applicants: Joseph Peterson, Chandler, AZ (US);
Jessica Peterson, Chandler, AZ (US)

(72) Inventors: Joseph Peterson, Chandler, AZ (US);
Jessica Peterson, Chandler, AZ (US)

( * ) Notice: Subject to any disclaimer, the term of this patent is extended or adjusted under 35 U.S.C. 154(b) by 145 days.

(21) Appl. No.: 15/426,172

(22) Filed: Feb. 7, 2017

(51) Int. Cl.
*A47C 7/72* (2006.01)
*B60N 2/28* (2006.01)
*B60N 2/56* (2006.01)
*B60N 2/26* (2006.01)

(52) U.S. Cl.
CPC .............. *B60N 2/28* (2013.01); *B60N 2/265* (2013.01); *B60N 2/5628* (2013.01); *B60N 2/5657* (2013.01)

(58) Field of Classification Search
CPC ......... B60N 2/5635; A47C 7/744; A47C 7/74; B60H 1/00285; B60H 2001/003
USPC ... 297/180.1, 180.13, 180.14, 250.1, 180.11, 297/217.1, 488
See application file for complete search history.

(56) References Cited

U.S. PATENT DOCUMENTS

| | | | |
|---|---|---|---|
| 4,051,768 A | 10/1977 | Bayles | |
| 4,923,248 A * | 5/1990 | Feher | A47C 7/74 297/180.11 |
| 4,981,324 A * | 1/1991 | Law | A47C 7/74 297/180.11 |
| 5,002,336 A * | 3/1991 | Feher | A47C 7/744 297/180.13 |
| 5,372,402 A * | 12/1994 | Kuo | A47C 7/74 297/180.11 |
| 5,382,075 A * | 1/1995 | Shih | A47C 7/74 297/180.11 |
| 5,613,729 A * | 3/1997 | Summer, Jr. | A47C 7/74 297/180.11 |
| 5,715,695 A | 2/1998 | Lord | |
| 5,921,858 A * | 7/1999 | Kawai | B60N 2/5628 297/180.11 |
| 6,079,781 A * | 6/2000 | Tilley | B60H 1/00285 297/180.1 |
| 6,106,057 A * | 8/2000 | Lee | A47C 7/744 297/180.14 |
| 6,843,717 B1 | 1/2005 | Bennett | |
| 6,902,473 B1 * | 6/2005 | Goobeck | B60H 1/00564 454/127 |
| D537,640 S | 3/2007 | Spence | |
| 7,320,223 B1 | 1/2008 | Dabney | |
| 8,272,685 B2 * | 9/2012 | Lucas | B60N 2/5635 180/68.1 |
| 8,684,800 B2 | 4/2014 | Baldal | |
| 2004/0113468 A1 * | 6/2004 | Swanson | B60H 1/00592 297/180.13 |

(Continued)

FOREIGN PATENT DOCUMENTS

WO     2005053999     6/2005

*Primary Examiner* — Chi Q Nguyen
(74) *Attorney, Agent, or Firm* — Kyle A. Fletcher, Esq.

(57) ABSTRACT

The ventilated child car seat is a child safety seat with internal ductwork and vents. An external intake hose attaches to a vehicle air vent and directs the air from the vehicle environmental control system to the child seat. The internal ductwork and vents allow the heated or chilled air to circulate around the occupant of the child safety seat. Movable vent covers on the child safety seat allow the flow of air to be reduced or stopped.

14 Claims, 7 Drawing Sheets

(56) References Cited

U.S. PATENT DOCUMENTS

2008/0290702 A1* 11/2008 Shin ................... B60N 2/5628
                                                  297/180.13

* cited by examiner

VENTILATED CHILD CAR SEAT

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of child safety seats, more specifically, a child safety seat with a ventilation system that ties into the vehicle's environmental control system.

SUMMARY OF INVENTION

The ventilated child car seat is a child safety seat with internal ductwork and vents. An external intake hose attaches to a vehicle air vent and directs the air from the vehicle environmental control system to the child seat. The internal ductwork and vents allow the heated or chilled air to circulate around the occupant of the child safety seat. Movable vent covers on the child safety seat allow the flow of air to be reduced or stopped.

An object of the invention is to provide adequate ventilation to the occupant of a child safety seat.

A further object of the invention is to allow the ventilated child car seat to connect to the environmental control system of many different makes and models of vehicles.

Yet another object of the invention is to allow the flow of air to the occupant of the ventilated child car seat to be reduced or stopped.

Another object of the invention is to provide convenient access to the hose connection that supplies air to the ventilated child car seat.

These together with additional objects, features and advantages of the ventilated child car seat will be readily apparent to those of ordinary skill in the art upon reading the following detailed description of the presently preferred, but nonetheless illustrative, embodiments when taken in conjunction with the accompanying drawings.

In this respect, before explaining the current embodiments of the ventilated child car seat in detail, it is to be understood that the ventilated child car seat is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the ventilated child car seat.

It is therefore important that the claims be regarded as including such equivalent construction insofar as they do not depart from the spirit and scope of the ventilated child car seat. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

Figure 1:
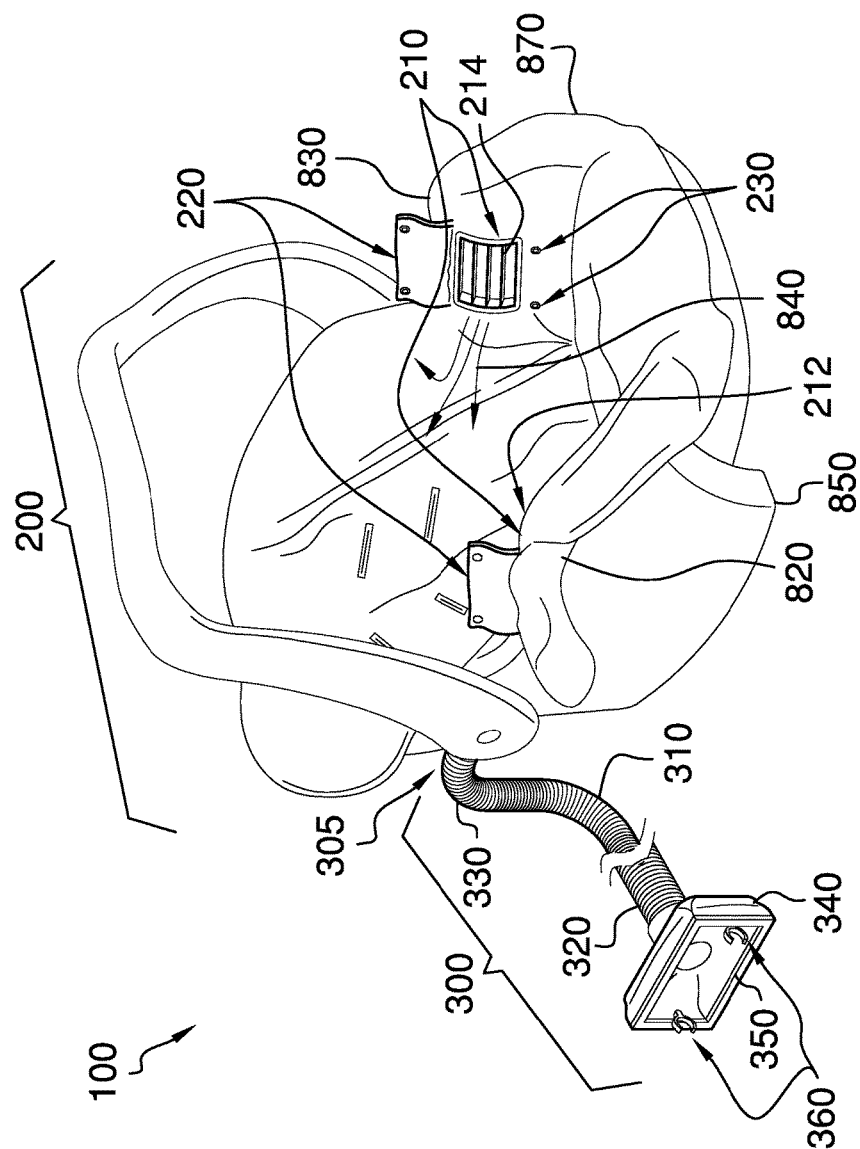
FIG. 1 is a perspective view of an embodiment of the disclosure.
Figure 2:
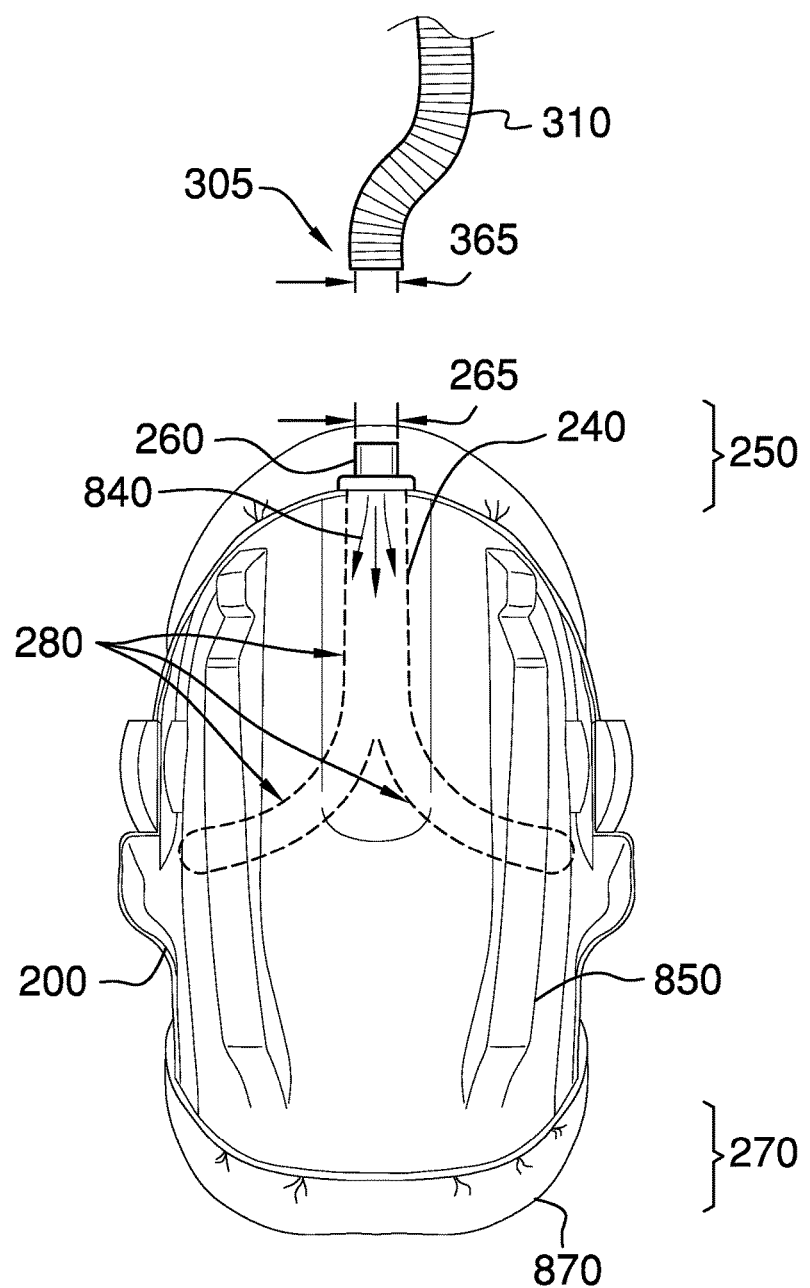
FIG. 2 is a bottom view of an embodiment of the disclosure.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the work "or" is intended to be inclusive. As used herein, the word "hose" is intended to include hoses, tubing, piping, and other conduits capable of directing an airflow. As used herein, the term "snap fastener" is intended to refer to a fastener comprising a pair of interlocking discs, made out of a metal or plastic wherein a circular lip under one disc fits into a groove on the top of the other, holding them fast until a certain amount of force is applied; snap fasteners are sometimes referred to as press studs, poppers, or snaps).

Detailed reference will now be made to a first potential embodiment of the disclosure, which is illustrated in FIGS. 1 through 8.

The ventilated child car seat 100 (hereinafter invention) comprises a ducted child seat 200 and an intake hose assembly 300. The intake hose assembly 300 attaches via an intake 340 to a vehicle air vent 810 and by a hose end 305 to a hose connection 260 of the ducted child seat 200. The ducted child seat 200 distributes an air flow 840 delivered to the ducted child seat 200 by the intake hose assembly 300 to one or more air vents 210 located on the ducted child seat 200.

The ducted child seat 200 comprises a shell 850, one or more pads 870, a restraint harness 880, the one or more air vents 210, an internal ductwork 240, and the hose connection 260. The shell 850 provides form and support to the ducted child seat 200. The one or more pads 870 provide comfort to the occupant (not shown) of the ducted child seat 200 and the restraint harness 880 holds the occupant in the ducted child seat 200. The ducted child seat 200 uses the vehicle seat belt (not shown) and anchor points (not shown) to remain securely in place on a vehicle seat 860 during a vehicular accident.

The one or more air vents 210 may be distributed on the ducted child seat 200 in order to disperse the air flow 840 around the occupant of the ventilated child car seat 100. In some embodiments, the one or more air vents comprise a first air vent 212 located one on a right armrest 820 and a second air vent 214 located on a left armrest 830. In some embodiments, the one or more air vents 210 may have internal louvers (not shown) to direct the air flow in a specific direction.

The internal ductwork 240 delivers the air flow 840 from the hose connection 260 to the one or more air vents 210. In some embodiments, the internal ductwork 240 may take the form of one or more hoses 280 routed through or under the shell 850 of the ducted child seat 200. In certain embodiments, the internal ductwork 240 may take the form of one or more molded channels 290 incorporated into the shell 850 of the ducted child seat 200. The hose connection 260 comprises an external attachment point for the intake hose assembly 300. The hose connection 260 may generally be round and limited in size to match an air hose 310 that will attach to it. Specifically, the hose connection 260 may have an outside diameter 265 that is no larger than an inside diameter 365 of the air hose 310. The hose connection 260 is attached to the internal ductwork 240 such that the air flow 840 into the hose connection 260 continues into the internal ductwork 240.

Figure 3:
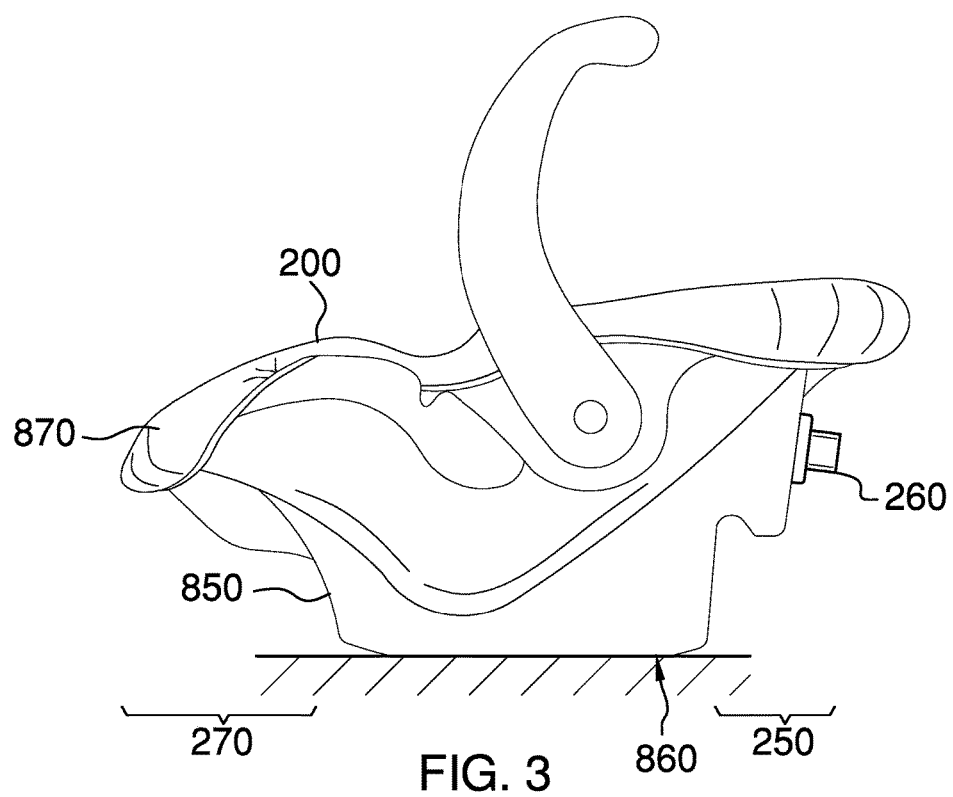
FIG. 3 is a side view of an embodiment of the disclosure.
Figure 4:
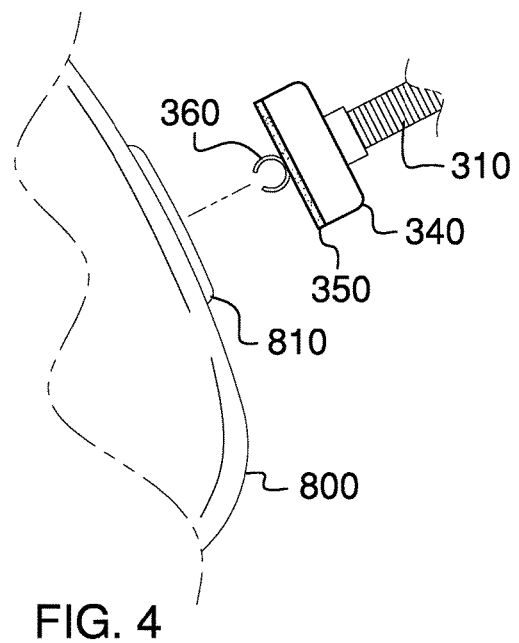
FIG. 4 is a detail view of an embodiment of the disclosure illustrating the intake about to be attached to a vehicle vent.
Figure 5:
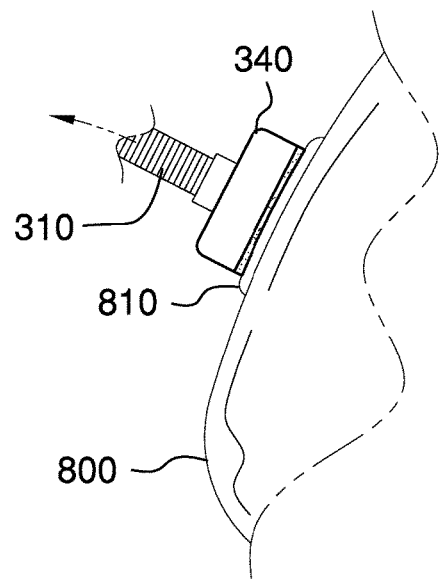
FIG. 5 is a detail view of an embodiment of the disclosure illustrating the intake in place on a vehicle vent.
Figure 6:
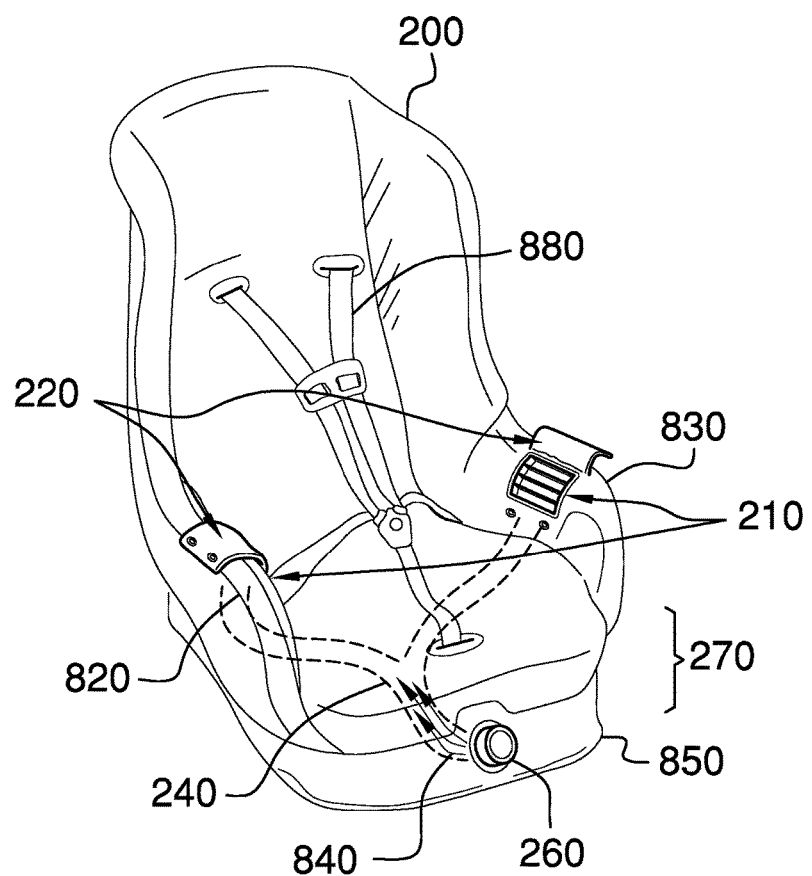
FIG. 6 is a perspective view of an alternative embodiment of the disclosure.
Figure 7:
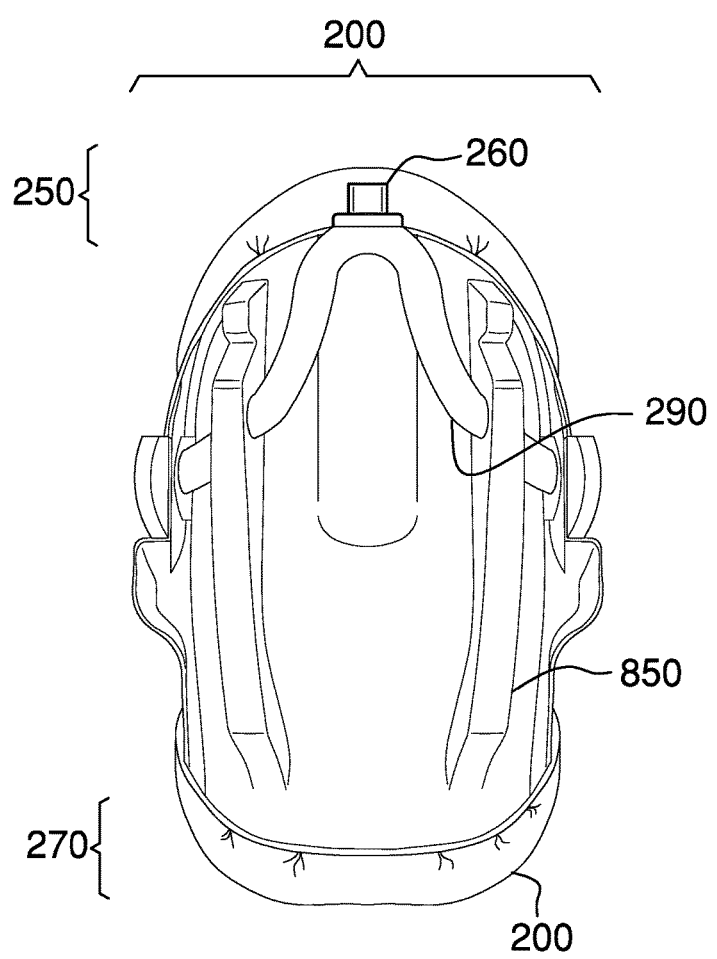
FIG. 7 is a bottom view of an embodiment of the disclosure that incorporates molded channels.
Figure 8:
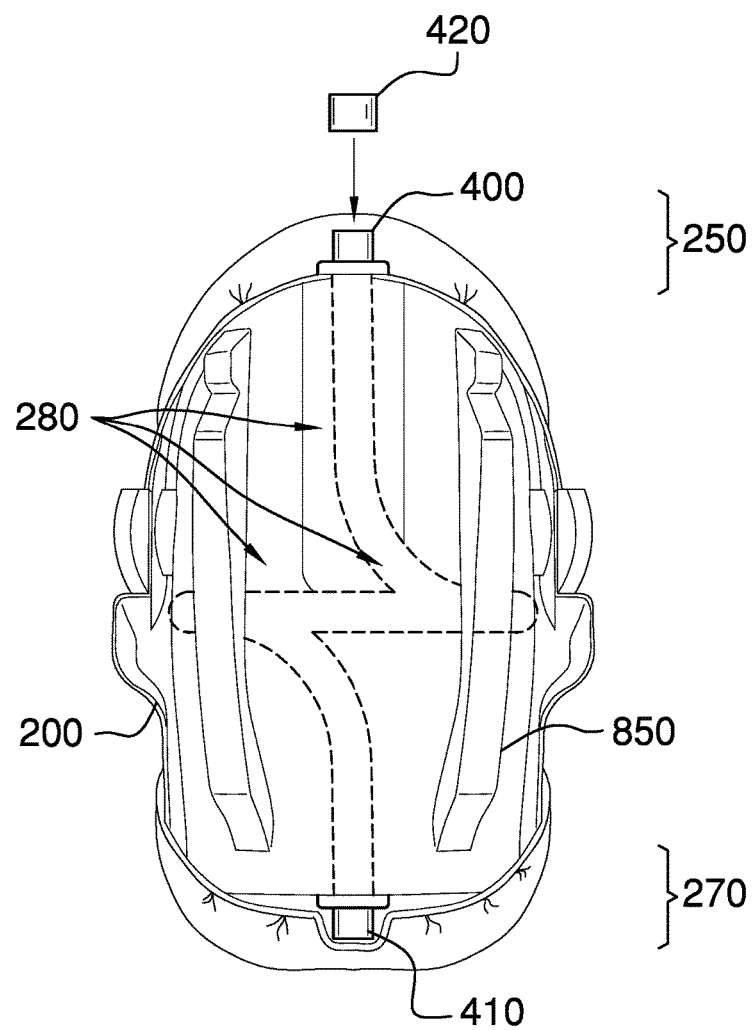
FIG. 8 is a bottom view of an embodiment of the disclosure that provides dual hose connections.

In some embodiments, the hose connection 260 is located on a rear portion 250 of the ducted child seat 200 (as shown in FIG. 3). In some embodiments, the hose connection 260 may be located on a front portion 270 of the ducted child seat 200 (as shown in FIG. 6). In some embodiments, a first hose connection 400 may be located on the rear portion 250 of the ducted child seat 200, a second hose connection 410 may be located on the front portion 270 of the ducted child seat 200, and the first hose connection 400 and the second hose connection 410 may both connect to the internal ductwork 240 (as shown in FIG. 7). In such a configuration, a hose connection stopper may be provided to close the first hose connection 400 while the second hose connection 410 is used, or vice versa. As a non-limiting example, the hose connection stopper 420 may be a rubberized cap that fits over the first hose connection 400 or over the second hose connection 410, whichever is unused.

The ducted child seat 200 may comprise one or more air vent covers 220. In some embodiments the one or more air vent covers 220 may be movable into one or more positions, which reduce or stop the air flow 840 from the one or more vents 210. In some embodiments, the one or more air vent covers 220 may comprise hinged flaps. In certain embodiments, the one or more air vent covers 220 may be completely detachable from the ducted child seat 200. In some embodiments, the one or more air vent covers 220 may comprise one or more vent cover retainers 230 capable of holding the one or more air vent covers 220 in place. In some embodiments, the one or more vent cover retainers 230 may be snap fasteners.

The intake hose assembly 300 comprises the intake 340 and the air hose 310. The purpose of the intake 340 is to couple the intake hose assembly 300 to the vehicle air vent 810. The intake 340 may be positioned over the vehicle air vent 810 to collect the air flow 840 issuing from the vehicle air vent 810 and to direct the air flow 840 into the air hose 310. The intake comprises one or more clips 360 that may hold the intake in place over the vehicle air vent 810. As a non-limiting example, the one or more clips 360 may squeeze together as the one or more clips 360 are pressed into the vehicle air vent 810, may pass between louvers (not shown) of the vehicle air vent 810, and may return to their original position once the one or more clips 360 are past the louvers of the vehicle air vent 810. Pressure from the one or more clips 360 against the back side of the louvers may hold the intake tightly against the vehicle air vent 810. A firm pull on the intake 340 may cause the one or more clips 360 to squeeze together again and allow the one or more clips 360 to slide past the louvers and out of the vehicle air vent 810. The intake 340 may couple to the vehicle air vent 810 that is located on a dashboard 800 of a vehicle, on the rear of a center console (not shown in the figures), on passenger compartments side walls (not shown in the figures), or on any interior surface of the passenger compartment where the vehicle air vent 810 may be located.

The intake may comprise a seal 350 to eliminate or reduce the amount of air that bypasses the intake 340 and escapes into the vehicle. As a non-limiting example, the seal may take the form of a gasket surrounding the opening of the intake 340 and constructed from rubber, foam, or some other compressible material.

The air hose 310 is attached at a first end 320 to the intake 340 such that the air flow 840 into the intake 340 continues into the air hose 310. The method of attaching the air hose 310 to the intake 340 may be a press fit. A second end 330 of the air hose 310 attaches to the hose connection 260 of the ducted child seat 200. The method of attaching the air hose 310 to the hose connection 260 may be a press fit.

In some embodiments, the intake 340 may be of specific dimensions and have specific placement and style of the one or more clips 360 so as to match with the vehicle air vent 810 of a specific vehicle or family of vehicles. Therefore, an assortment of the intake 340 components may exist and the intake 340 may be selected for use with a specific vehicle. The intake 340 needed for a specific vehicle may be acquired individually or it may be acquired as part of a set of such components. In some embodiments, the intake 340 may be detachable from the air hose 310 and may be replaceable by the intake 340 matching a different vehicle.

In use, the intake hose assembly 300 may be coupled to the ducted child seat 200 by sliding the second end 330 of the air hose 310 onto the hose connection 260 of the ducted child seat 200. The ventilated child car seat 100 may then be placed on the vehicle seat 860 and secured in a manner consistent with the use of child car safety seats. If necessary, the intake 340 may be coupled to the first end 320 of the air hose 310 by sliding the air hose 310 onto the intake 340. The intake 340 may then be coupled to the vehicle air vent 810 as was previously described. The vehicle environmental control system (not shown in the figures) may be adjusted to produce a desired quantity and temperature of the air flow 840 out of the vehicle air vent 810. The one or more air vent covers 220 on the ducted child seat 200 may be set to a desired position—allowing or disallowing the air flow 840 near the occupant of the ventilated child car seat 100. The occupant (not shown in the figures) may be strapped into the ducted child seat 200. The ventilated child car seat 100 may be removed from service by reversing the process.

With respect to the above description, it is to be realized that the optimum dimensional relationship for the various components of the invention described above and in FIGS. 1 through 8, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A ventilated child car seat comprising:
a ducted child seat and an intake hose assembly;
wherein the intake hose assembly attaches via an intake to a vehicle air vent and by a hose end to a hose connection of the ducted child seat;
wherein the ducted child seat distributes an air flow delivered to the ducted child seat by the intake hose assembly to one or more air vents located on the ducted child seat;
wherein the ducted child seat comprises a shell, one or more pads, a restraint harness, the one or more air vents, an internal ductwork, and the hose connection;
wherein the shell provides form and support to the ducted child seat;
wherein the one or more pads provide comfort to an occupant of the ducted child seat;
wherein the restraint harness holds the occupant in the ducted child seat;
wherein the one or more air vents are distributed on the ducted child seat in order to disperse the air flow around the occupant of the ventilated child car seat;
wherein the one or more air vents comprise a first air vent located one on a right armrest and a second air vent located on a left armrest;
wherein the internal ductwork delivers the air flow from the hose connection to the one or more air vents;
wherein the hose connection comprises an external attachment point for the intake hose assembly;
wherein the hose connection is round and limited in size to an outside diameter that is no larger than an inside diameter of an air hose;
wherein the hose connection is attached to the internal ductwork such that the air flow into the hose connection continues into the internal ductwork.

2. The ventilated child car seat according to claim 1 wherein the internal ductwork comprises one or more hoses routed through or under the shell of the ducted child seat.

3. The ventilated child car seat according to claim 1 wherein the internal ductwork comprises one or more molded channels incorporated into the shell of the ducted child seat.

4. The ventilated child car seat according to claim 1 wherein the hose connection is located on a rear portion of the ducted child.

5. The ventilated child car seat according to claim 1 wherein the hose connection is located on a front portion of the ducted child seat.

6. The ventilated child car seat according to claim 1 wherein a first hose connection is located on the rear portion of the ducted child seat;
wherein a second hose connection is located on the front portion of the ducted child seat;
wherein the first hose connection and the second hose connection both connect to the internal ductwork;
wherein a hose connection stopper closes or opens the first hose connection while the second hose connection is used or not in use.

7. The ventilated child car seat according to claim 1 wherein the ducted child seat comprises one or more air vent covers;
wherein the one or more air vent covers are movable into one or more positions which reduce or stop the air flow from the one or more air vents.

8. The ventilated child car seat according to claim 7 wherein the one or more air vent covers are detachable from the ducted child seat.

9. The ventilated child car seat according to claim 8 wherein the one or more air vent covers comprise one or more vent cover retainers capable of holding the one or more air vent covers in place.

10. The ventilated child car seat according to claim 9 wherein the intake hose assembly comprises the intake and the air hose;
wherein the intake couples the intake hose assembly to the vehicle air vent;
wherein the intake is positioned over the vehicle air vent to collect the air flow issuing from the vehicle air vent and to direct the air flow into the air hose.

11. The ventilated child car seat according to claim 10 wherein the intake comprises one or more clips that hold the intake in place over the vehicle air vent.

12. The ventilated child car seat according to claim 11 wherein the intake comprises a seal;
wherein the seal eliminates or reduces the amount of air that bypasses the intake and escapes into the vehicle.

13. The ventilated child car seat according to claim 12 wherein the air hose is attached at a first end to the intake;
wherein the air flow into the intake continues into the air hose;
wherein a second end of the air hose attaches to the hose connection of the ducted child seat.

14. The ventilated child car seat according to claim 13 wherein the intake is detachable from the air hose and is replaceable by the intake matching a different vehicle.

* * * * *